United States Patent [19]

Toyoda et al.

[11] 4,128,531
[45] Dec. 5, 1978

[54] THERMOSETTING RESIN COMPOSITION

[75] Inventors: Shinichi Toyoda, Katsuta; Masahiko Sakai; Kazuo Goto, both of Hitachi; Toshikazu Narahara, Tokaimura; Yoshiharu Karasawa, Hitachi, all of Japan

[73] Assignee: Hitachi Chemical Company, Ltd., Japan

[21] Appl. No.: 843,205

[22] Filed: Oct. 18, 1977

[30] Foreign Application Priority Data

Oct. 30, 1976 [JP] Japan .............................. 51-131417

[51] Int. Cl.$^2$ ............................................ C08L 63/00
[52] U.S. Cl. ............................ 528/53; 260/77.5 AM; 260/830P; 260/836; 260/837 R; 528/75; 528/73; 528/51; 528/55
[58] Field of Search ...... 260/47 EC, 2 EC, 77.5 AM, 260/837, 830 P, 836; 526/11.2

[56] References Cited

U.S. PATENT DOCUMENTS

| | | | |
|---|---|---|---|
| 3,459,828 | 8/1969 | Michelotti et al. | 260/830 |
| 3,496,250 | 2/1970 | Czerwinski | 260/836 |
| 3,525,779 | 8/1970 | Hawkins | 260/830 |
| 3,636,133 | 1/1972 | Hawkins | 260/824 EP |
| 3,694,406 | 9/1972 | D'Alelio | 260/47 EP |
| 4,055,541 | 10/1977 | Riew | 260/47 EN |

Primary Examiner—Harold D. Anderson
Assistant Examiner—E. A. Nielsen
Attorney, Agent, or Firm—Craig & Antonelli

[57] ABSTRACT

A thermosetting resin composition comprising a polyfunctional epoxy compound such as diglycidyl ether of bisphenol A, a polyfunctional isocyanate such as diphenylmethane diisocyanate, a curing agent and polybutadiene type polymer having terminal hydroxyl groups can produce cured articles excellent in heat resistance and crack resistance.

8 Claims, No Drawings

THERMOSETTING RESIN COMPOSITION

This invention relates to a thermosetting resin composition excellent in heat resistance and crack resistance.

In recent years, miniaturization and weight-saving of various electronic parts and electric devices have been desired. In order to attain such a desire, it becomes necessary to develop resins which are used for sealing a part or whole of these materials and have more excellent heat resistance. In compliance with such requirement, the present inventors have developed thermosetting resin compositions containing polyfunctional epoxy compounds, polyfunctional isocyanate compounds and curing catalysts. (Japanese Patent Application Kokoku (Post-Exam Publn) No. 31,000/77) Cured articles obtained from these compositions have heat resistance higher than class H but when used as sealing mediums for electric devices and the like containing complicated inserts (sealed materials), peeling of the inserts and cracks often occur due to cycles of cooling and heating during practical operation under more severe practical application conditions, which lowers function of the devices. In order to improve such defects, there have been proposed a method of bringing expansivity of a cured sealing medium to that of an insert by increasing compounding proportion of an inorganic filler to the sealing medium so as to lower expansivity of the sealing medium, and a method of making a cured sealing medium flexible by compounding an agent of imparting flexibility with said thermosetting resin composition. In the former method, however, there are many disadvantages in that when the proportion of the inorganic filler becomes larger, not only there increases a tendency to damage the surface of insert by the inorganic filler, but also there lowers the proportion of the resin in the sealing medium, said resin being in contact with the surface of insert, which lowers adhesion or bonding between the insert and the sealing medium and often generates peeling. On the other hand, in the latter method, since heat resistance of agents of imparting flexibility generally used are insufficient, thermal degradation of the agent of imparting flexibility by heating cycles often lowers heat resistance of the cured sealing medium itself.

It is an object of this invention to provide a thermosetting resin composition which is excellent in heat resistance and crack resistance, and contains an agent of imparting flexibility without lowering heat resistance.

This invention provides a thermosetting resin composition comprising
(a) one or more polyfunctional epoxy compounds,
(b) one or more polyfunctional isocyanates,
(c) one or more curing agents, and
(d) at least one polymer of butadiene having terminal hydroxyl groups represented by the formula:

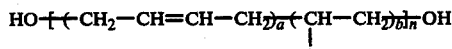

or

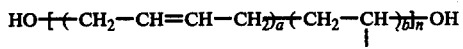

wherein R is a hydrogen atom, an alkyl, alkenyl, nitrilo or phenyl group; $a \geq 0.7$, $b \leq 0.3$, and $a + b = 1$; and n is an integer which determines the molecular weight of the polymer of butadiene in the range of from 500 to 5,000.

As the polyfunctional epoxy compounds, the component (a), there can be used bifunctional epoxy compounds such as diglycidyl ether of bisphenol A, butadiene diepoxide, 3,4-epoxycyclohexylmethyl-(3,4-epoxy)-cyclohexane carboxylate, vinylcyclohexene dioxide, 4,4'-di(1,2-epoxyethyl) diphenyl ether, 4,4'-(1,2-epoxyethyl) biphenyl, 2,2-bis(3,4-epoxycyclohexyl) propane, diglycidyl ether of resorcin, diglycidyl ether of phloroglucinol, diglycidyl ether of methylphloroglucinol, bis(2,3-epoxycyclopentyl) ether, 2-(3,4-epoxy)cyclohexane-5,5-spiro(3,4-epoxy)-cyclohexane-m-dioxane, bis(3,4-epoxy-6-methylcyclohexyl) adipate, N,N'-m-phenylenebis(4,5-epoxy-1,2-cyclohexanedicarboxyimide), and the like; tri-or higher polyfunctional epoxy compounds such as triglycidyl ether of para-aminophenol, polyallyl glycidyl ether, 1,3,5-tri(1,2-epoxyethyl) benzene, 2,2',4,4'-tetraglycidoxy benzophenone, tetraglycidoxy tetraphenyl methane, tetraglycidoxy tetraphenyl ethane, polyglycidyl ether of phenol-formaldehyde novolac, triglycidyl ether of glycerin, triglycidyl ether of trimethylolpropane, triglycidyl isocyanurate, polyglycidyl ether of cresol-formaldehyde novolac, and the like.

As the polyfunctional isocyanates, the component (b), there can be used bifunctional isocyanates such as methane diisocyanate, butane-1,2-diisocyanate, butane-1,1-diisocyanate, ethane-1,2-diisocyanate, trans-vinylene diisocyanate, propane-1,3-diisocyanate, butane-1,4-diisocyanate, 2-butene-1,4-diisocyanate, 2-methylbutane-1,4-diisocyanate, pentane-1,5-diisocyanate, 2,2-dimethylpentane-1,5-diisocyanate, hexane-1,6-diisocyanate, heptane-1,7-diisocyanate, octane-1,8-diisocyanate, nonane-1,9-diisocyanate, decane-1,10-diisocyanate, dimethylsilane diisocyanate, diphenylsilane diisocyanate, ω,ω'-1,3-dimethylbenzene diisocyanate, ω,ω'-1,4-dimethylbenzene diisocyanate, ω,ω'-1,3-dimethylcyclohexane diisocyanate, ω,ω'-1,4-dimethylcyclohexane diisocyanate, ω,ω'-1,4-dimethylbenzene diisocyanate, ω,ω'-1,4-dimethylnaphthalene diisocyanate, ω,ω'-1,1'-dimethylnaphthalene diisocyanate, ω,ω'-1,5-dimethylnaphthalene diisocyanate, cyclohexane-1,3-diisocyanate, cyclohexane-1,4-diisocyanate, dicyclohexylmethane-4,4'-diisocyanate, 1,3-phenylene diisocyanate, 1,4-phenylene diisocyanate, 1-methylbenzene-2,4-diisocyanate, 1-methylbenzene-2,5-diisocyanate, 1-methylbenzene-2,6-diisocyanate, 1-methylbenzene-3,5-diisocyanate, diphenyl ether-4,4'-diisocyanate, diphenyl ether-2,4'-diisocyanate, naphthalene-1,4-diisocyanate, naphthalene-1,5-diisocyanate, biphenyl-4,4'-diisocyanate, 3,3'-dimethylbiphenyl-4,4'-diisocyanate, 2,3'-dimethoxybiphenyl-4,4'-diisocyanate, diphenylmethane-4,4'-diisocyanate, 3,3'-dimethoxydiphenylmethane-4,4'-diisocyanate, 4,4'-dimethoxydiphenylmethane-3,3'-diisocyanate, diphenylsulfide-4,4'-diisocyanate, diphenylsulfone-4,4'-diisocyanate, and the like; tri- or higher polyfunctional isocyanates such as polymethylene polyphenyl isocyanates, triphenylmethane triisocyanate, tris(4-phenyl isocyanate thiophosphate), 3,3',4,4'-diphenylmethane tetraisocyanate, and the like. There can also be used dimers and trimers of these isocyanates.

There can also be used halogenated polyfunctional isocyanates as the polyfunctional isocyanates, the component (b). Examples of the halogenated isocyanates are 1-bromomethylbenzene-2,6-diisocyanate, 1-chlorobenzene-2,4-diisocyanate, 1,3-dichlorobenzene-2,4-diisocyanate, 1-bromobenzene-2,4-diisocyanate, 1-bromomethylbenzen-2,4-diisocyanate, 1,3-dibromobenzene-2,4-diisocyanate, and the like.

Examples of the epoxy compounds containing one or more halogen atoms in the molecule are glycidyl ethers of halogenated phenols such as brominated epoxy compounds obtained by using tetrabromobisphenol A or dibromobisphenol A as a starting material, chlorinated epoxy compounds obtained by using tetrachlorobisphenol A or dichlorobisphenol A as a starting material, brominated epoxy compounds obtained by using dibromophenol or tribromophenol as a starting material, brominated epoxy compounds obtained by forming glycidyl ethers of p-bromophenol novolac, and the like. So far as they are polyfunctional, they can also be used as the component (a).

It is preferable to use 0.1 to 25.0 equivalent quantity of the polyfunctional isocyanate, more preferably to use 1.5 to 15.0 equivalent quantity of the polyfunctional isocyanate, per 1.0 equivalent quantity of the polyfunctional epoxy compound.

The polymers of butadiene having terminal hydroxyl groups are polybutadiene type polymers represented by the formula:

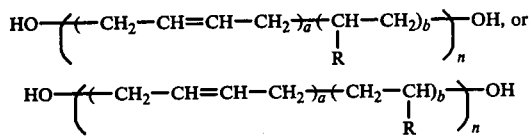

wherein R, a, b and n are as defined above. In the above formulas, n can be an integer of, for example, from 14 to 107, and b can be zero. The said polymers of butadiene having terminal hydroxyl groups can contain the units of the formulas

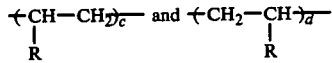

wherein $c + d = b$, at the same time.

The said polymers of butadiene having terminal hydroxyl groups can be obtained by activating the both ends of a polymer of butadiene obtained by polymerizing butadiene and ethylene, styrene, acrylonitrile, propylene, 1-butene, 2-butene, 1,3-butadiene, 1,4-pentadiene or the like using as a catalyst n-butyllithium complex, Na-naphthalene complex, Li-naphathalene complex, Li-methylnaphthalene or the like in the presence of a solvent such as tetrahydrofuran, pentane, benzene, diethyl ether, toluene, cyclohexane, heptane or the like and using a conventional polymerization technique, said activation being able to be carried out by the reaction using an alkylene oxide, an aldehyde, a ketone or the like. Commercially available polymers of butadiene having terminal hydroxyl groups are liquid rubbers Poly bd ® R - 45M, R - 45HT, CS - 15, CN - 15 (trade names, manufactured by Idemitsu Petrochemical Co., Ltd.), and the like.

Molecular weight of the said polymers of butadiene having terminal hydroxyl groups is in the range of from 500 to 5,000. If the molecular weight is more than 5,000 the viscosity increases and workability is unfavorably lowered, whereas if the molecular weight is less than 500, no cured article having high toughness can be obtained and crack resistance shows a tendency to be lowered unfavorably. In order to obtain excellent crack resistance, a and b in the above-mentioned formulas should be a ≧ 0.7 and b ≦ 0.3.

In order to obtain excellent physical properties of cured articles, particularly in heat resistance and crack resistance, preferably 3 to 100 parts by weight, more preferably 10 to 60 parts by weight of the polymer of butadiene having terminal hydroxyl groups is mixed with 100 parts by weight of the total of the component (a) polyfunctional epoxy compound, the component (b) polyfunctional isocyanate, and the component (c) curing agent.

As the curing agents, the component (c), which can form isocyanurate rings and oxazolidone rings in the molecular structure on the heat reaction of the composition of this invention, there can be used amines, quaternary ammonium salts, imidazoles, organic compounds containing atoms belonging to the group of Vb of the periodic table, and the like.

Examples of the amines are oxyalkylamines such as trimethylamine, triethylamine, tetramethylbutanediamine, tetramethylpentanediamine, tetramethylhexanediamine, dimethylamino-ethanol, dimethylaminopentanol, and the like; dimethylaniline, tris-dimethylaminomethyl phenol (DMP - 30), N-methyl morpholine, N-ethyl morpholine, triethylenediamine, N,N-dimethylanilane, N,N-dimethylbenzylamine, tributylamine, tripropylamine, N-methylpiperazine, N-ethylpiperazine, N-methylpiperidine, and the like.

Examples of the quaternary ammonium salts are cetyltrimethylammonium bromide, cetyltrimethylammonium chloride, dodecyltrimethylammonium iodide, trimethyldodecylammonium chloride, benzyldimethyltetradecylammonium chloride, benzyldimethylpalmitylammonium chloride, allyldodecyltrimethylammonium bromide, benzyldimethylstearylammonium bromide, stearyltrimethylammonium chloride, benzyldimethyl-tetradecylammonium acetate, and the like.

Examples of the imidazoles are 2-methylimidazole, 2-ethylimidazole, 2-phenylimidazole, 2-undecylimidazole, 2-heptadecylimidazole, 2-methyl-4-ethylimidazole, 1-butylimidazole, 1-propyl-2-methylimidazole, 1-benzyl-2-methylimidazole, 1-cyanoethyl-2-methylimidazole, 1-cyanoethyl-2-undecylimidazole, 1-cyanoethyl-2-phenylimidazole, 1-(4,6-diamino-s-triazinyl-2-ethyl)-2-methylimidazole, 1-(4,6-diamino-s-triazinyl-2-ethyl)-2-phenylimidazole, 1-(4,6-diamino-s-triazinyl-2-ethyl)-2-isopropylimidazole, 1-(4,6-diamino-s-triazinyl-2-ethyl)-2-ethylimidazole, 1-(4,6-diamino-s-triazinyl-2-ethyl)-2-undecylimidazole, and the like.

Examples of the organic compounds containing at least one atom belonging to the group of Vb of the periodic table are compounds of P, As, Sb, Bi, and N in combination with tetrasubstituted borates represented by the formulas:

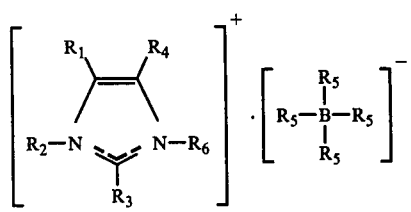

-continued

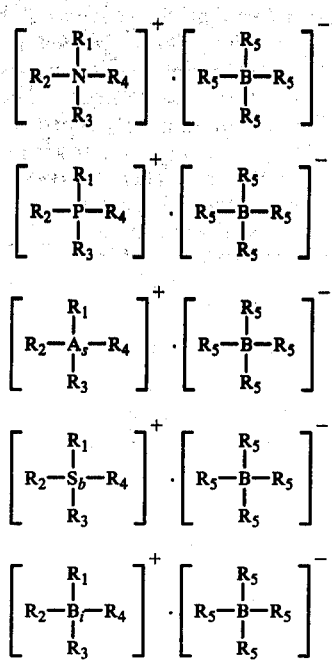

wherein $R_1$, $R_2$, $R_3$, $R_4$ and $R_6$ are independently hydrogen, alkyl preferably having 1 to 11 carbon atoms, alkenyl preferably having 1 to 11 carbon atoms, phenyl or aralkyl, and $R_5$ is phenyl or aralkyl. Among them, those containing N and P are preferable because of easy availability and good workability.

The curing agent is preferably used in a proportion of 0.1 to 10.0% by weight based on the weight of the thermosetting resin composition.

The thermosetting resin composition can contain, if desired, inorganic filler such as silica, clay, plaster, quartz glass powder, calcium carbonate, kaolin, mica, hydrated alumina, talc, dolomite, zircon, titanium oxide, magnesite, molybdenum disulfide, antimony trioxide, antimony sulfide, bismuth sulfide, triphenyl antimony, antimony chloride, and the like.

If a coupling agent is added to the thermosetting resin composition in order to make the inorganic filler more compatible with the resin, the viscosity of casting resin is lowered and workability is increased, and resistance to misture after cured is improved. As the coupling agents, those of epoxy silane series and of amino silane series are preferable.

Since cured articles obtained from the thermosetting resin compositions of this invention by conventional techniques such as casting, dripping, dipping, impregnating, injection-molding are excellent in heat resistance and crack resistance, the thermosetting resin compositions can be used for producing sealing or molding mediums for electronic parts or electric devices and the like. Further since the resin compositions of this invention can be liquid at room temperature, they can be used as solvent-free varnishes having excellent workability.

This invention is illustrated by way of the following examples in which all parts and percents are by weight unless otherwise specified.

EXAMPLES 1-4

A mixture (A) was prepared by mixing 100 parts of diglycidyl ether of bisphenol A (epoxy equivalent 174), 200 - 800 parts of diphenylmethane diisocyanate (isocyanate equivalent 140), and 0.5 part of N,N-dimethylbenzylamine. To the mixture (A), a copolymer of butadiene and acrylonitrile having terminal hydroxyl groups (liquid rubber Poly bd ® CN - 15, manufactured by Idemitsu Petrochemical Co., Ltd., acrylonitrile content 15%, molecular weight about 5,000, $a = 0.85$, $b = 0.15$ and $n = 78$-$87$) was added in amounts as listed in Table 1 to give the desired compositions. The resulting composition was cured by heating at 80° C. for 1 hour and at 180° C. for 15 hours. Heat distortion temperature was measured in order to evaluate heat resistance.

Crack resistance was evaluated as follows. In a test tube having a diameter of 18 mm, a bundle of 30 insulating wires coated with polyamide-imide resin (AIW, each having a diameter of 2.0 mm and a length of 10 cm) was placed and the composition mentioned above was poured thereinto and subjected to curing under the same conditions as mentioned above to give a mold sample. Using the resulting sample, there was carried out a thermal recycling test in which the sample was allowed to stand at an upper temperature for 1 hour and then immediately it was allowed to stand at a lower temperature for 1 hour, and these operations (1 cycle) were repeated until cracks were generated. The upper temperature was fixed at room temperature and the lower temperature was changed from 0° C. to −10° C., −20° C., −30° C. −40° C., −50° C., −60° C. with the lapse of one cycle. Crack resistance was evaluated by the temperature at which cracks were generated.

The results are as shown in Table 1.

EXAMPLES 5-8

To the mixture (A) obtained in Example 1 but the proportions of the ingredients were as listed in Table 1, a copolymer of butadiene and acrylonitrile having terminal hydroxyl groups (liquid rubber Poly bd ® CN - 15, used in Examples 1-4) was added in amounts as listed in Table 1 to give the desired compositions. Using the resulting compositions, heat resistance and crack resistance were evaluated in the same manner as described in Example 1. The results are as shown in Table 1.

EXAMPLES 9-12

To the mixture (A) obtained in Example 1 but the proportions of the ingredients were as listed in Table 1, a copolymer of butadiene and acrylonitrile having terminal hydroxyl groups (liquid rubber Poly bd ® CN - 15) was added in amounts as listed in Table 1 to give the desired compositions. Using the resulting compositions, heat resistance and crack resistance were evaluated in the same manner as described in Example 1. The results are as shown in Table 1.

EXAMPLES 13-16

To the mixture (A) obtained in Example 1, polybutadiene having terminal hydroxyl groups (liquid rubber Poly bd ® R - 45HT, manufactured by Idemitsu Petrochemical Co., Ltd., molecular weight 2,734) was added in amounts as listed in Table 1 to give the desired compositions. Using the resulting compositions, heat resistance and crack resistance were evaluated in the same manner as described in Example 1. The results are as shown in Table 1.

EXAMPLES 17-20

To the mixture (A) obtained in Example 1, a copolymer of butadiene and styrene having terminal hydroxyl groups (liquid rubber Poly bd® CS - 15, manufactured by Idemitsu Petrochemical Co., Ltd., $a = 0.75$, $b = 0.25$, $n = 54$, styrene content 25%) was added in amounts as listed in Table 1 to give the desired compositions. Using the resulting compositions, heat resistance and crack resistance were evaluated in the same manner as described in Example 1. The results are as shown in Table 1.

Comparative Example 1

For comparison, the mixture (A) obtained in Example 1 alone was cured and heat resistance and crack resistance were evaluated in the same manner as described in Example 1. The results are as shown in Table 1.

ture, a copolymer of butadiene and acrylonitrile having terminal hydroxyl groups (liquid rubber Poly bd® CN - 15, used in Examples 1-4) was added in amounts as listed in Table 2 to give the desired compositions. Further powdered molten quartz glass, silica flour and calcium carbonate were gradually added to the compositions in amounts as listed in Table 2 with stirring so as to be dispersed sufficiently. Then the resulting compositions were degassed under a pressure of 1 mmHg for 5 minutes. Using these compositions, heat resistance and crack resistance were evaluated in the same manner as described in Example 1. The results are as shown in Table 2.

Comparative Example 2

For comparison, a composition containing no copolymer of butadiene and acrylonitrile having terminal hydroxyl groups was also tested. The results are as shown in Table 2.

Table 1

| | | Example | | | | | | | | |
|---|---|---|---|---|---|---|---|---|---|---|
| | | 1 | 2 | 3 | 4 | 5 | 6 | 7 | 8 | 9 |
| Composition (parts) | Poly bd® CN - 1 15 | 10 | 20 | 50 | 100 | 10 | 20 | 50 | 100 | 10 |
| | Poly bd® R - 45HT | — | — | — | — | — | — | — | — | — |
| | Poly bd® CS - 15 | — | — | — | — | — | — | — | — | — |
| | Diglycidyl ether of bisphenol A (epoxy equivalent 174) | 100 | 100 | 100 | 100 | 100 | 100 | 100 | 100 | 100 |
| | Diphenylmethane diisocyanate (isocyanate equivalent 140) | 200 | 200 | 200 | 200 | 400 | 400 | 400 | 400 | 800 |
| | N,N-Dimethylbenzylamine | 0.5 | 0.5 | 0.5 | 0.5 | 0.5 | 0.5 | 0.5 | 0.5 | 0.5 |
| Heat distortion temperature (°C) | | >220 | >220 | >220 | >220 | >220 | >220 | >220 | >220 | >220 |
| Crack generating temperature (°C) | | −40 | −50 | <−60 | <−60 | −30 | −40 | −50 | −60 | −20 |

| | Example | | | | | | | | | | *1 |
|---|---|---|---|---|---|---|---|---|---|---|---|
| | 10 | 11 | 12 | 13 | 14 | 15 | 16 | 17 | 18 | 19 | 20 | |
| | 20 | 30 | 100 | — | — | — | — | — | — | — | — | — |
| | — | — | — | 10 | 20 | 50 | 100 | — | — | — | — | — |
| | — | — | — | — | — | — | — | 10 | 20 | 50 | 100 | — |
| | 100 | 100 | 100 | 100 | 100 | 100 | 100 | 100 | 100 | 100 | 100 | 100 |
| | 800 | 800 | 800 | 200 | 200 | 200 | 200 | 200 | 200 | 200 | 200 | 200 |
| | 0.5 | 0.5 | 0.5 | 0.5 | 0.5 | 0.5 | 0.5 | 0.5 | 0.5 | 0.5 | 0.5 | 0.5 |
| | >220 | >220 | >220 | >220 | >220 | >220 | 210 | >220 | >220 | >220 | 210 | >220 |
| | −30 | −40 | −40 | −10 | −20 | −30 | −60 | −10 | −20 | −50 | −50 | *2 |

Note)
*1: Comparative Example.
*2: Cracks were generated at the curing.

EXAMPLES 21-26

A mixture was prepared by mixing 100 parts of diglycidyl ether of bisphenol A (epoxy equivalent 174), 200 parts of diphenylmethane diisocyanate (isocyanate equivalent 140) and 0.5 part of 1-cyanoethyl-2-ethyl-4-methylimidazole (molecular weight 163). To the mix- As is clear from the results in Tables 1 and 2, remarkable improvement in crack resistance without lowering heat resistance was obtained by addition of polybutadiene type polymers or copolymers having terminal hydroxyl groups.

Table 2

| | | Example | | | | | | *1 |
|---|---|---|---|---|---|---|---|---|
| | | 21 | 22 | 23 | 24 | 25 | 26 | |
| Composition (parts) | Poly bd® CN - 15 | 50 | 100 | 50 | 100 | 50 | 100 | — |
| | Quartz glass powder (100 - 350 mesh, Tyler st.) | 350 | 400 | — | — | — | — | 300 |
| | Silica flour (100 - 350 mesh, Tyler st.) | — | — | 350 | 400 | 200 | 200 | — |
| | Calcium carbonate powder (100 - 350 mesh, Tyler st.) | — | — | — | — | 100 | 150 | — |
| | Diglycidyl ether of bisphenol A (epoxy equivalent 174) | 100 | 100 | 100 | 100 | 100 | 100 | 100 |
| | Diphenylmethane diisocyanate (isocyanate equivalent 140) | 200 | 200 | 200 | 200 | 200 | 200 | 200 |
| | 1-Cyanoethyl-2-ethyl-4-methylimidazole | 0.5 | 0.5 | 0.5 | 0.5 | 0.5 | 0.5 | 0.5 |
| Heat distortion temperature (°C) | | >220 | >220 | >220 | >220 | >220 | >220 | >220 |
| Crack generating temperature (°C) | | <−60 | <−60 | <−60 | <−60 | <−60 | <−60 | −10 |

Note)
*1: Comparative Example 2

What is claimed is:

1. A thermosetting resin composition comprising
(a) one or more polyfunctional epoxy compounds,
(b) one or more polyfunctional isocyanates,
(c) one or more curing agents, and
(d) at least one polymer of butadiene having terminal hydroxyl groups represented by the formula:

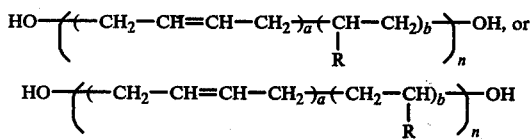

wherein R is hydrogen, alkyl, alkenyl, nitrilo, or phenyl; $a \geq 0.7$, $b \leq 0.3$, and $a + b = 1$; and n is an integer which determines the molecular weight of the polymer of butadiene in the range of from 500 to 5,000.

2. A composition according to claim 1, wherein the curing agent is at least one member selected from the group consisting of amines, quaternary ammonium salts and imidazoles.

3. A composition according to claim 1, wherein the component (d) is contained in an amount of from 3 to 100 parts by weight per 100 parts by weight of the total of the components (a), (b) and (c).

4. A composition according to claim 1, wherein at least one of the polyfunctional epoxy compound and the polyfunctional isocyanate contains one or more halogen atoms in the molecule.

5. A composition according to claim 1, wherein the polyfunctional epoxy compound is diglycidyl ether of bisphenol A.

6. A composition according to claim 1, wherein the polyfunctional isocyanate is diphenylmethane dissocyanate.

7. A composition according to claim 1, wherein the polymer of butadiene having terminal hydroxyl groups is a copolymer of butadiene and acrylonitrile having terminal hydroxyl groups.

8. A composition according to claim 1, wherein the polymer of butadiene having terminal hydroxyl groups is a copolymer of butadiene and styrene having terminal hydroxyl groups.